United States Patent
Sundaram et al.

(10) Patent No.: US 10,979,362 B2
(45) Date of Patent: Apr. 13, 2021

(54) ELASTIC RESOURCE POOLING FOR DYNAMIC THROUGHPUT REBALANCING

(71) Applicant: Microsoft Technology Licensing, LLC, Redmond, WA (US)

(72) Inventors: Sankar Sundaram, Bellevue, WA (US); Briton Zurcher, Sammamish, WA (US); Manu Srivastava, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 16/146,366

(22) Filed: Sep. 28, 2018

(65) Prior Publication Data

US 2020/0106712 A1 Apr. 2, 2020

(51) Int. Cl.
*H04L 12/911* (2013.01)
*H04L 12/917* (2013.01)
(Continued)

(52) U.S. Cl.
CPC .......... *H04L 47/72* (2013.01); *G06F 9/5072* (2013.01); *G06F 9/5083* (2013.01);
(Continued)

(58) Field of Classification Search
CPC ..... G06F 9/00; G06F 9/06; G06F 9/46; G06F 9/50; G06F 9/5005; G06F 9/5011–5077; G06F 9/5083; G06F 2209/5011; H04L 41/00; H04L 41/08; H04L 41/0896; H04L 41/14; H04L 41/50–5025; H04L 41/5038; H04L 41/5041; H04L 41/5051;
(Continued)

(56) References Cited

U.S. PATENT DOCUMENTS

| 5,719,854 A | * | 2/1998 | Choudhury | ........... G06F 9/5027 370/231 |
| 5,996,013 A | * | 11/1999 | Delp | ..................... G06F 9/5027 370/232 |

(Continued)

OTHER PUBLICATIONS

"International Search Report and Written Opinion Issued in PCT Application No. PCT/US2019/039124", dated Oct. 9, 2019, 11 Pages.

*Primary Examiner* — Boris D Grijalva Lobos
(74) *Attorney, Agent, or Firm* — Holzer Patel Drennan

(57) ABSTRACT

A method for utilizing elastic resource pooling techniques to dynamically rebalance throughput includes determining, for each of multiple tenants leasing computing resources of a shared resource pool, a desired claim to resources in the shared resource pool. The desired claim is based on a number of resource access requests received in association with each of the multiple tenants. The method further includes determining, for each of the multiple tenants, a guaranteed claim and a maximum potential claim on the shared resource pool; and allocating a surplus resource pool among the multiple tenants based on the determined maximum potential claim and the desired claim for each one of the multiple tenants, the surplus resource pool representing a remainder of the shared resource pool after the guaranteed claim for each of the tenants is satisfied via an initial resource allocation from the shared resource pool.

17 Claims, 9 Drawing Sheets

(51) Int. Cl.
*H04L 12/24* (2006.01)
*G06F 9/50* (2006.01)

(52) U.S. Cl.
CPC ...... *H04L 41/5006* (2013.01); *H04L 41/5009* (2013.01); *H04L 47/76* (2013.01); *H04L 47/783* (2013.01); *G06F 2209/5011* (2013.01)

(58) Field of Classification Search
CPC ......... H04L 47/00; H04L 47/70; H04L 47/72; H04L 47/76; H04L 47/78; H04L 47/783
See application file for complete search history.

(56) References Cited

U.S. PATENT DOCUMENTS

| | | | | |
|---|---|---|---|---|
| 7,996,846 | B2* | 8/2011 | McCarthy | G06F 9/5011 709/223 |
| 8,060,883 | B1* | 11/2011 | Rao | G06F 9/5077 709/226 |
| 8,065,682 | B2* | 11/2011 | Baryshnikov | G06F 9/5027 718/104 |
| 8,141,075 | B1* | 3/2012 | Chawla | G06F 9/45558 718/1 |
| 8,612,330 | B1* | 12/2013 | Certain | G06Q 30/06 705/37 |
| 9,069,610 | B2* | 6/2015 | Chakravorty | G06F 9/50 |
| 9,471,391 | B1* | 10/2016 | Abramson | G06F 9/5072 |
| 10,007,555 | B1* | 6/2018 | Kuhne | G06F 9/50 |
| 10,097,478 | B2* | 10/2018 | To | H04L 47/783 |
| 2002/0029274 | A1* | 3/2002 | Allen | H04L 29/06 709/226 |
| 2003/0236854 | A1* | 12/2003 | Rom | H04L 47/15 709/217 |
| 2006/0129687 | A1 | 6/2006 | Goldszmidt et al. | |
| 2008/0034370 | A1* | 2/2008 | Huizenga | G06F 9/5011 718/104 |
| 2014/0244841 | A1 | 8/2014 | Gulati et al. | |
| 2015/0178137 | A1* | 6/2015 | Gordon | H04L 67/1008 709/226 |
| 2016/0212065 | A1* | 7/2016 | To | H04L 47/783 |
| 2017/0244784 | A1 | 8/2017 | Lam et al. | |

* cited by examiner

ELASTIC RESOURCE POOLING FOR DYNAMIC THROUGHPUT REBALANCING

BACKGROUND

Software as a service (SaaS) is a software licensing and delivery model in which software is licensed on a subscription basis and is centrally hosted. SaaS providers face challenges in apportioning computing resources to different tenants that lease those services. When resources are statically allocated between tenants, a large portion of resources may go unused at any given time. Conversely, dynamic, need-based resource allocation methods tend to give preference to high-activity tenants and may, at times, leave one or more tenants with insufficient computing resources to satisfy a current computing demand. Moreover, some tenants may be willing to purchase higher-cost packages to be guaranteed a set resource unit quantity or performance support level at all times. Current need-based resource allocation methods are insufficient to provide such guarantees without over-allocating resources that, at times, go unused.

BRIEF DESCRIPTIONS OF THE DRAWINGS

SUMMARY

Figure 1:
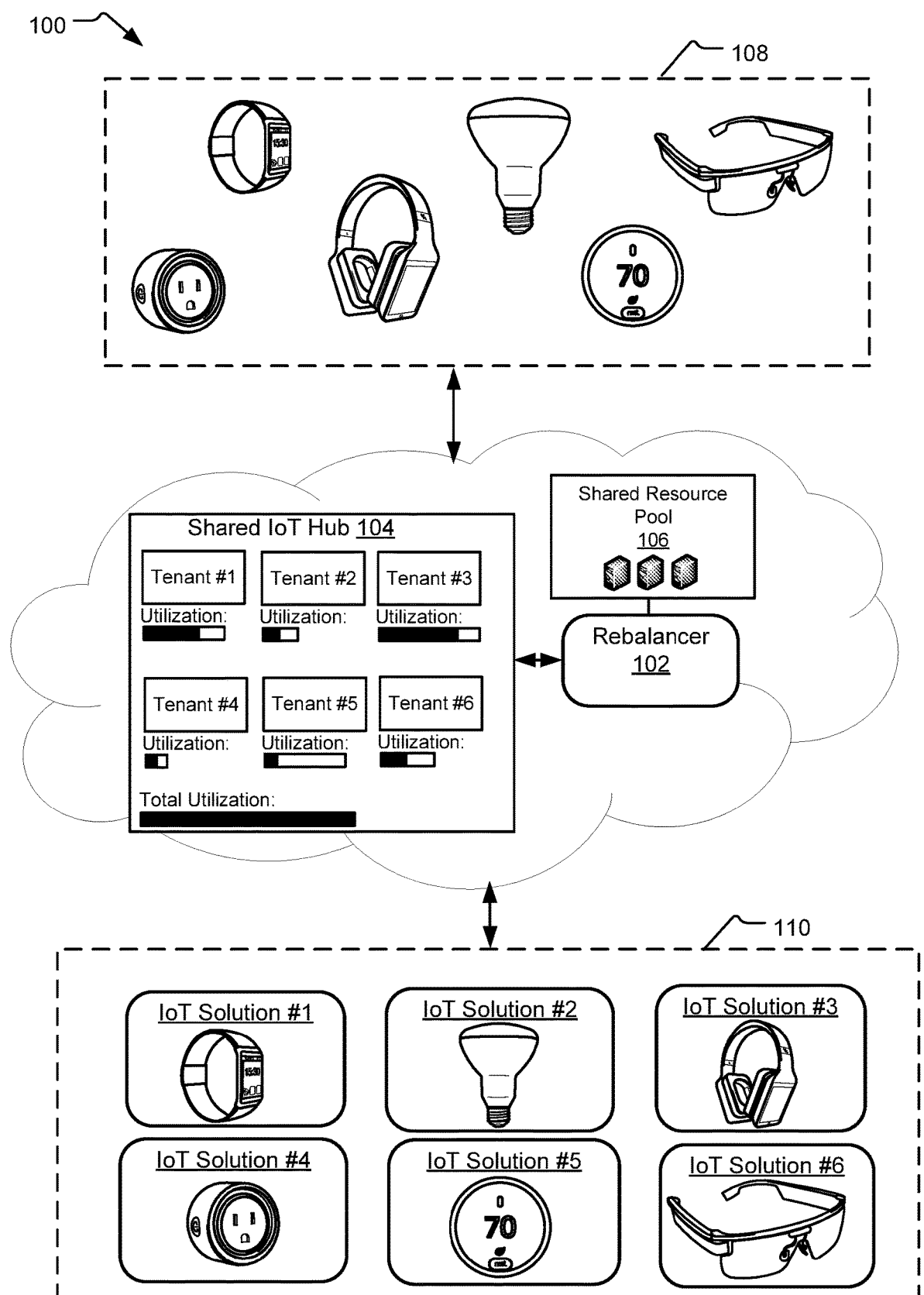
FIG. 1 illustrates a system that utilizes elastic pooling techniques to dynamically rebalance resources between multiple tenants to a shared IoT (internet-of-things) hub.

A method for elastically allocating a shared resource pool includes determining, for multiple tenants leasing computing resources of the shared resource pool, a desired claim to resources, such as based on a number of resource access requests received at an endpoint associated with each one of the multiple tenants. The method further includes determining, for each of the multiple tenants, a guaranteed claim and a maximum potential claim on the shared resource pool, and allocating a surplus resource pool among the multiple tenants based on the determined maximum potential claim and the desired claim for each one of the multiple tenants.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Allocation systems that allow SaaS (software as a service) providers to reserve fixed quantities of computing resources for each individual subscriber (also referred to herein as a "tenant") are prone to large-scale inefficiencies due to the fact that some reserved computing resources may remain unused a majority of the time. To avoid over-allocating SaaS resources to individual subscribers, other allocation systems allow SaaS providers to dynamically allocate SaaS computing resources based on current demand. However, need-based resource allocation methods are often at odds with consumer-requested guarantees to enjoy a fixed cap on the minimum quantity of SaaS resources available to them at any given time.

Existing resource allocation solutions do not adequately resolve the above-described conflict between need-based (dynamic) allocation and static (non-dynamic) allocation methods that may allow different tenants to individually set their own fixed minimum resource caps, such as by offering different SaaS subscription tiers associated with different fixed minimum caps. The herein disclosed technology provides methods for dynamically allocating a pool of computing resources among multiple tenants sharing the pool based on need-based demands while also guaranteeing tenants both (1) an individually fixed minimum cap on available resources and (2) an individually-fixed claim to a fraction of "surplus" resources. This solution allows for full utilization of available resources at all times, which prevents resources from being held in reserve and remaining unused while also providing tenants some individual control over the resources they may access at any given time.

By example and without limitation, the disclosed technology is described herein with reference to a particular type of SaaS known as an IoT (internet-of-things) hub. In general, IoT hubs provide services that manage data flows between web-based IoT application(s) and the smart devices managed by those IoT applications. For example, a web-based IoT application provider may lease an IoT hub and computing resources to streamline the ingest of high volumes of telemetry from smart devices into an associated web-based IoT application. In this context, the IoT hub acts as a central message hub that passes bi-directional communications (e.g., device-to-cloud telemetry, cloud-to-device commands) between one or more IoT solutions and the smart devices managed by those solutions. Each IoT hub may be provisioned with a certain number of resource units that influences the maximum daily quota of messages that the IoT hub can send to and from IoT solution(s) and smart devices.

Different web-based solution providers that lease IoT hubs and associated computing resources may have very different activity support needs. For example, some IoT hub tenants may require active messaging support to and from a few thousand devices once a day while other IoT hub tenants may require active messaging support to from a few million devices once per minute. Consequently, IoT hub providers face challenges in apportioning resource units to each IoT hub in a manner that is cost-feasible and fair for all tenants.

When resources are statically allocated between tenants, a large portion of resources may go unused at any given time. Conversely, dynamic, need-based resource allocation methods tend to give preference to high-activity tenants, which may—at high-activity times—leave one or more tenants to the IoT hub with insufficient resources to guarantee a set level of device support. Moreover, a purely need-based dynamic allocation solution may not be able to guarantee competitive uplink and downlink times to a tenant that is willing to purchase a higher-cost IoT hub subscription package.

FIG. 1 illustrates a system 100 that utilizes elastic pooling techniques to dynamically rebalance resources between multiple tenants to a shared IoT hub 104. The shared IoT hub 104 generally represents multiple, individual IoT hubs that are each leased by a different tenant and that share a common pool of computing resources (e.g., a shared resource pool 106). For instance, the configuration of FIG. 1 may be understood as representing a group of IoT hubs where each IoT hub in the group is leased by one of six different tenants (labeled Tenant #1-Tenant #6). For example, tenant 1 has a first IoT hub; tenant 2 has a second IoT hub, and so on. Each of the leased IoT hubs within the shared IoT hub 104 is supported by resources that are dynamically allocated from the shared resource pool 106.

In one implementation, each of the tenants to the shared IoT hub 104 is a provider of a web-based IoT solution (e.g., one of multiple IoT solutions 110). For example, each of the tenants to the shared IoT hub 104 provides a web-based IoT solution designed to manage certain types of the smart devices 108.

In general, the term "smart device" is used herein to refer to an electronic device with processing and data transmission capabilities, and more specifically, a device that is managed by a corresponding IoT solution. By example and without limitation, FIG. 1 illustrates smart devices 108 including various types of household devices (e.g., a smart lightbulb, a smart electrical plug, a smart thermostat, a smart watch, smart headphones, and a smart headset). Each of the IoT solutions may be effective to configure, control, command, or otherwise facilitate user interactions with a subset of the smart devices 108. For example, a user may interact with a mobile application of one of the IoT solutions 110 to program a time schedule for a smart light bulb, electrical plug, etc.

The shared IoT hub 104 facilitates bi-directional communications (e.g., device connection requests, device-to-cloud telemetry, cloud-to-device commands) between the smart devices 108 and the corresponding IoT solutions 110. In one implementation, each of the IoT solutions 110 associated with a different uniform resource identifier (URI) and the shared IoT hub 104 facilitates data ingest to the URI and messaging between the URI and the associated smart devices 108.

In one implementation, the shared resource pool 106 includes a certain number of total computing resource units that influences a maximum daily quota of messages that the shared IoT hub 104 can send to and from the smart devices 108 and the associated IoT solutions 110. The system 100 includes a rebalancer 102 that dynamically allocates the resource units of the shared resource pool 106 to the different tenants based on current activities of each tenant (e.g., need-based considerations) and also based on subscription parameters pre-set in association with each tenant (e.g., fairness considerations).

In one implementation, allocation of the resources from the shared resource pool 106 entails determining, for each tenant, a desired claim to the shared resource pool 106, a guaranteed claim to the shared resource pool 106, and a maximum potential claim to surplus resources remaining in the shared resource pool 106 after guaranteed resources are allocated. The desired claim is need-based. For example, the rebalancer 102 may assess access requests received at an ingestion endpoint associated with each tenant to determine the tenant's current desired claim to the resources of the shared resource pool 106. In contrast, the guaranteed claim and maximum potential claim may be parameters that are pre-set by the tenant or the SaaS service in association with the tenant's profile.

In one implementation, the rebalancer 102 implements allocation logic for dynamically rebalancing the resources of the shared resource pool 106 among tenants while ensuring that, when possible, the resulting allocation satisfies the desired claim for every one of the tenants to the shared IoT hub 104. When the cumulative total of desired claims to the shared resource pool 106 exceeds the availability of resources, the rebalancer 102 allocates the resources among the tenants in a manner that ensures that (1) all resources are allocated to provide support for current processing requests (e.g., no resources are "reserved" and unused) and (2) that all resources are allocated to satisfy the guaranteed claim for each tenant while also apportioning surplus resources based on (e.g., in fair proportion to) the pre-specified maximum potential claim of each tenant.

For example, FIG. 1 illustrates a scenario when the total utilization of the shared resource pool 106 is 100% even though each individual tenant is utilizing a different quantity of resources and/or a quantity of resources that may be less than the desired claim of each tenant. Despite the fact that all resources are utilized, each active tenant is guaranteed access to a set minimum of the resources and is granted a fraction of the resource surplus in proportion to a pre-set maximum potential claim that is individually set for each tenant, striking a balance between need-based considerations and fairness considerations that may be based on individual subscription tiers of the different tenants. As used herein, an "active tenant" refers to a tenant that is actively receiving requests to access resources of the shared resources pool 106.

Further details of elastic resource allocation are discussed in greater detail below.

Figure 2:
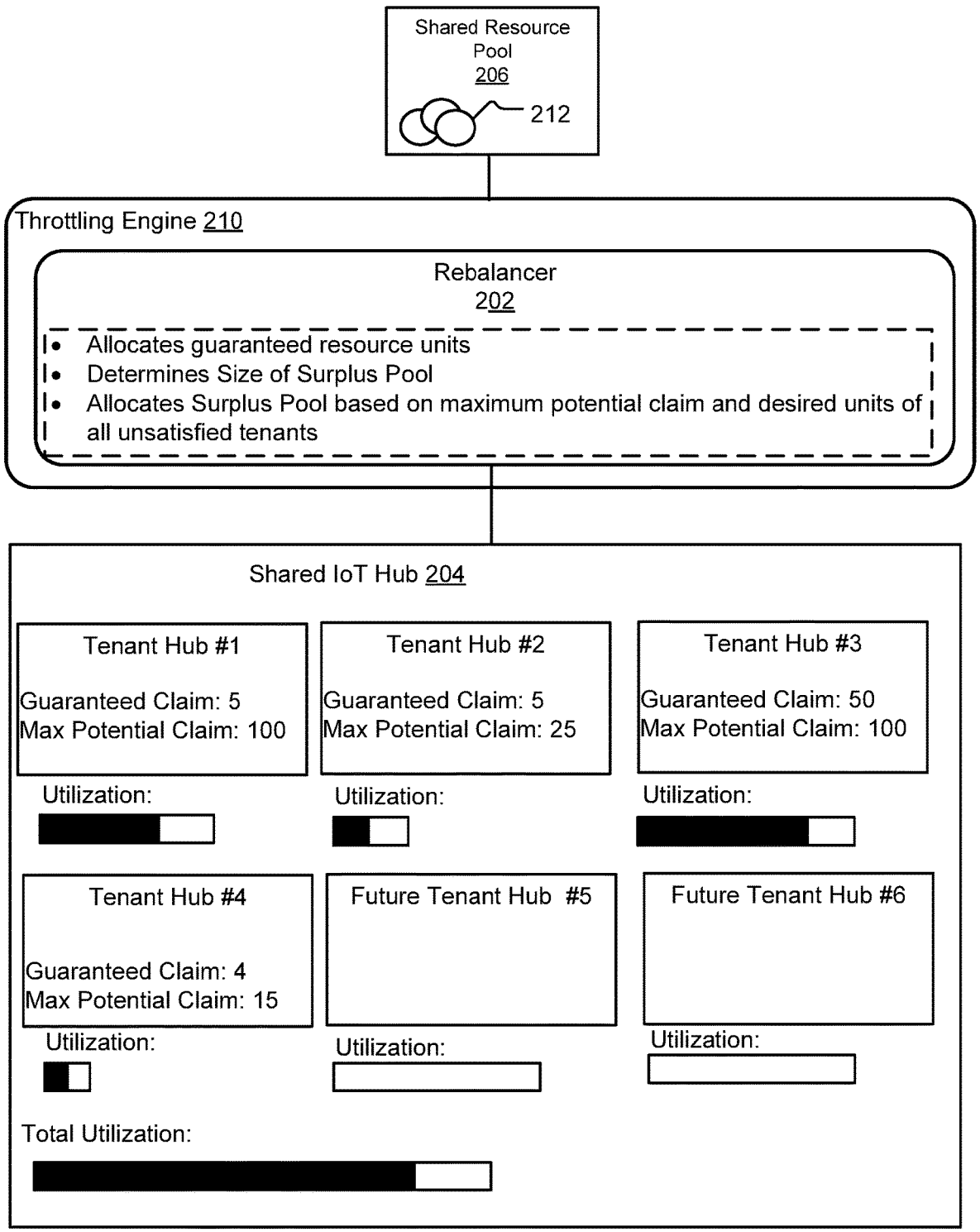
FIG. 2 illustrates another system with a rebalancer that utilizes elastic pooling techniques to dynamically rebalance computing resources of a shared IoT hub between multiple tenants.

FIG. 2 illustrates another system 200 with a rebalancer 202 that utilizes elastic pooling techniques to dynamically rebalance computing resources of a shared IoT hub 204 between multiple tenants. Each of multiple tenants to the shared IoT hub 204 leases an IoT hub service for streamlining flows of telemetry between smart devices and an associated web-based IoT solution managed by the tenant. In one implementation, the web-hosted IoT hub service provides each tenant to the shared IoT hub 204 with a software configuration effective to ingest data to an specific URI associated with a tenant-owned IoT solution (not shown).

In FIG. 2, the shared IoT hub 204 is provisioned to six IoT hubs, four of which are shown to be occupied (numbered as Tenant Hubs 1-4) and two of which are shown to be unoccupied (numbered as Future Tenant Hubs 5-6). Computing operations of each of the tenant hubs are supported by resources in a shared resource pool 206. In one implementation, the shared resource pool 206 includes set number of elastically-pooled resource units 212. The set number of resource units 212 influences a maximum quota of messages that the tenants of the shared IoT hub 204 can send to and from smart devices (not shown) and their associated IoT solution(s). In the example of FIG. 2, the shared resource pool 206 includes 200 resource units that may be elastically allocated and reallocated dynamically based on throughput to and from each of the tenant hubs 1-6.

In FIG. 2, the rebalancer 202 is shown to be included in a throttling engine 210. For each of the tenants to the shared IoT hub 204, the throttling engine 210 enforces one or more throttling limits to control the rate(s) at which incoming requests to the shared IoT hub 204 are processed by each of the resource units 212. For example, a throttling limit may specify a number of operations of a particular type per minute that may be executed by an individual one of the resource units 212. In one implementation, the throttling engine 210 sets different throttling limits for different types of events, such as by enforcing a first throttling limit for device-to-cloud events, a second throttling limit for cloud-to-device events, a third throttling limit for device connections, etc. For example, the resource units 212 may each support 120 device-to-cloud messages per second (e.g., 120 operations/sec/unit) while supporting 1.67 cloud-to-device messages per second (e.g., 1.67 operations/sec/unit).

Throughout each day, the rebalancer 202 dynamically alters the number of the resource units 212 provisioned to service requests directed to each different one of the tenant hubs. In one implementation, the rebalancer 202 dynamically rebalances the resource units 212 of the shared resource pool 206 among different tenants based on current activities of each tenant (e.g., need-based considerations) and also based on subscription parameters pre-set in association with each tenant (e.g., fairness considerations). In each instance of re-allocation, also referred to herein as "rebalancing," the rebalancer 202 retrieves both real-time request information and certain subscription parameters for each of the multiple tenant hubs.

During an example allocation of the resource units 212 to the tenant hubs 1-4 of the shared IoT hub 204, the rebalancer 202 determines a desired claim, which may be understood as a need-based claim to a subset of the resource units 212 of the shared resource pool 206. In one implementation, the desired claim for a particular tenant hub is determined based on access requests received at an ingestion endpoint for an individual tenant hub as well as current throttling limit(s) associated with that ingestion endpoint. For example, the ingestion endpoint (not shown) of Tenant Hub #1 may periodically communicate timestamp information and a number of requests received over a set time interval to the rebalancer 202. Based on the throttling configuration for the tenant hub, the rebalancer 202 calculates a request rate per second to determine a computing capacity sufficient to process incoming requests at a rate comparable to the incoming request rate. If, for example, Tenant Hub #1 is receiving 120 messages per second of a certain message type (e.g., cloud-to-device messages) and a throttling limit for the message type is currently set to 120 messages per minute, the rebalancer 202 may determine that the desired claim (e.g., the computing capacity sufficient to process the incoming requests) for Tenant Hub #1 is 60 resource units.

The above example refers to a scenario where Tenant Hub #1 is receiving requests of a single message type governed by a single throttling rate. As mentioned above, some implementations may enforce different throttling limits for different types of messaging requests. Unless stated otherwise, the term "desired claim" is used herein to refer to a total computing capacity sufficient to satisfy a cumulative (total) current computing demand on an individual IoT hub. For example, the desired claim for Tenant Hub #1 may be based on a calculation of the computing capacity requisite to satisfy the request rate for each of multiple different types of messages governed by different throttling rates.

In addition to determining a desired claim on the resource units 212, the rebalancer 202 also determines two pre-specified parameters that are not based on an evaluation of current resource request rates—"a guaranteed claim" and a "maximum potential claim." Each of the guaranteed claim and the maximum potential claim may be set individually for each tenant, such as according to subscription parameters selected by the tenant or pre-set in accord with a subscription tier that each tenant has subscribed to. For example, the rebalancer 202 may evaluate subscription parameters of each tenant to determine a guaranteed claim and/or a maximum potential claim to the resource units 212 of the shared resources pool 206. In one implementation, the guaranteed claim and the maximum potential claim are set in accord with a tenant's subscription profile. For example, a high-paying tenant may buy into a higher subscription tier that guarantees a guaranteed claim and/or maximum potential claim that is higher than that available via a cheaper, lower subscription tier.

The guaranteed claim for a tenant hub may be understood as a cap on the quantity of resources that are guaranteed to be allocated to the tenant hub when the hub is active (e.g., when the hub is receiving resource requests and/or actively using resources of the shared resources pool 206). In one implementation, each active tenant is allocated a quantity of guaranteed resources sufficient to satisfy its desired claim whenever the desired claim is smaller than or equal to the tenant's guaranteed claim. In contrast to the guaranteed claim, the maximum potential claim represents a stake that each tenant hub has in non-guaranteed resources or "surplus resources" of the shared resource pool 206. As used herein "surplus resources" refers to a subset of the resource units 212 remaining after the guaranteed resources are allocated to each of the active tenant hubs.

In one implementation, the rebalancer 202 implements allocation logic for dynamically allocating the resources of the shared resource pool 206 while ensuring that, when possible, the resulting allocation satisfies the desired claim for every one of the tenants to the shared IoT hub 204. When the cumulative total of tenant requests to access resources exceeds the availability of resources in the shared resource pool 206, the rebalancer 202 allocates the resources among the tenants in a manner that ensures that (1) all resources are allocated to provide support for current processing requests (e.g., no resources are "reserved" and unused) and (2) that all resources are allocated to satisfy the guaranteed claim for each tenant while also apportioning surplus resources based on (e.g., in fair proportion to) the pre-specified maximum potential claim of each tenant.

During an example allocation of the resource units 212 among the Tenant Hubs #1-4, the rebalancer 202 identifies subset of the resource units 212 that are guaranteed for distribution to a particular tenant hub (e.g., guaranteed resource units). To identify the guaranteed resource units, the rebalancer 202 calculates the desired claim for each tenant hub based on current request rates. When the desired claim is less than or equal to the guaranteed claim for a particular tenant hub, the tenant hub is guaranteed a quantity of resource units 212 equaling the desired claim (e.g., the guaranteed claim is adjusted to equal the desired claim). In cases when the desired claim for a tenant is greater than the guaranteed claim, the tenant hub is guaranteed a quantity of resource units equaling the guaranteed claim.

If, for example, the Tenant Hub #1 has a desired claim of six resource units and a guaranteed claim of five resource units (as shown), the Tenant Hub #1 guarantees five resource units in an initial allocation. If, alternatively, the Tenant Hub #1 has a desired claim of two resource units, Tenant Hub #1 is guaranteed two resource units in the initial allocation. By the above logic, each active tenant is guaranteed resources sufficient to satisfy a desired claim whenever the desired claim is smaller than or equal to the guaranteed claim.

After allocating the guaranteed quantity of the resource units 212 to each of the tenant hubs in the above manner, the rebalancer 202 determines a size of the surplus pool—the subset of the resource units 212 remaining. If, for example, there are initially 100 elastically-pooled resource units and the guaranteed claims annotated in FIG. 2 are allocated to each tenant, the total number of guaranteed claims is 64 (the sum of 5+5+50+4), and the surplus pool is 36, which equals the difference between the total number of pooled resource units (100) and the guaranteed units (64).

The rebalancer 202 next allocates the surplus pool (e.g., 36 resource units in the above example) among unsatisfied tenants according to a metric that is both need-based (e.g., based on the desired claim for each tenant hub) and fairness-based (e.g., based on the pre-set maximum potential for each tenant hub requesting additional resources). As used herein, an "unsatisfied tenant" refers to a tenant when a desired claim is not satisfied by a current resource allocation. An exemplary allocation process and suitable metrics for implementing such are discussed in greater detail with respect to FIGS. 3 and 4, below.

Figure 3:
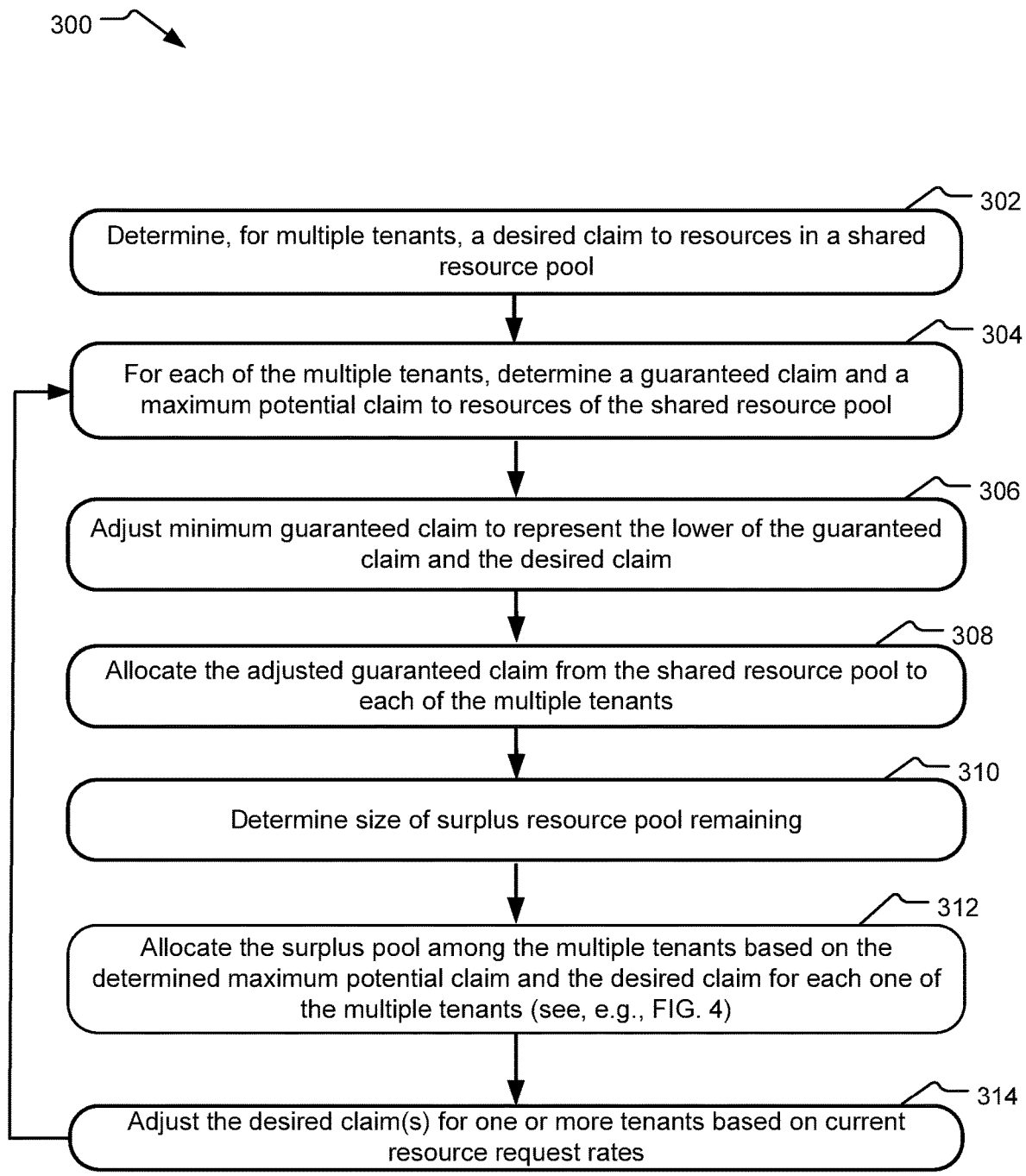
FIG. 3 illustrates example operations for allocating elastically-pooled computing resources between multiple tenants.

FIG. 3 illustrates example operations 300 for allocating elastically-pooled computing resources between multiple tenants leasing a web-based software service, such as an IoT hub. A determining operation 302 determines a desired claim that each of the multiple tenants has to the pooled computing resources. In one implementation, the desired claim is determined for each tenant based on a rate of incoming messages received at an endpoint (e.g., an IoT hub gateway) requesting access to the resources. For example, the desired claim may equal the amount of computing resources sufficient to process incoming requests at a rate at which the incoming requests are received.

In some implementations, the determining operation 302 dynamically determines different request rates associated with different types of incoming requests. For example, different request rates may be associated with different types of messages (e.g., device connection requests, device-to-cloud requests, cloud-to-device requests) received at an IoT hub gateway. In this case, the desired claim may represent a total computing capacity sufficient to cumulatively satisfy the various determined request rates according to a current throttling configuration for the IoT hub.

Another determining operation 304 determines, for each of the multiple tenants, a guaranteed claim and a maximum potential claim to resources of the shared resource pool. In one implementation, the guaranteed claim and the maximum potential claim are set individually for each tenant, such as based on subscription parameters selected by the tenant or in accord with a subscription tier that each tenant has subscribed to. In some implementations, the guaranteed claim and/or the maximum potential claim may be dynamically varied by the tenant. For example, the tenant may select an optional configuration to increase the maximum potential claim and/or the guaranteed claim at any given time. For this reason, the determining operation 304 may determine (e.g., request from the tenant) the guaranteed claim and the maximum potential claim during each iteration of resource allocation.

An adjustment operation 306 adjusts the minimum guaranteed claim to represent the lower of the guaranteed claim and the desired claim to the shared computing resources. An allocation operation 308 allocates guaranteed resources, which may be understood as the resources sufficient to satisfy the adjusted guaranteed claim of each tenant, from the shared resource pool.

A determining operation 310 determines a size of a surplus resource pool remaining from the shared resources pool after the allocation operation 308. For example, the size of the surplus pool may equal the difference between the total number of resource units available in the shared resource pool and the total number of resource units allocated via the allocation operation 308. Another allocation operation 312 allocates the surplus pool among the multiple tenants based on the determined maximum potential claim and the desired claim for each one of the multiple tenants. Example sub-operations of the allocation operation 312 are discussed in detail with respect to FIG. 4.

Following the allocation operation 312, a parameter update operation 314 adjusts the desired claim(s) for one or more tenants based on current (updated) resource request rates. Response to adjusting the one or more of the desired claims, the operations 304, 306, 308, 310, and 312 repeat. In one implementation, the parameter update operation 314 is performed after a set time has elapsed following the allocation operation 312. For example, the parameter update operation 314 may be repeated once per 30 seconds, once per minute, etc., depending upon system parameters. In another implementation, the parameter update operation 314 is performed responsive to a tenant request for additional resources from the shared resource pool.

Figure 4:
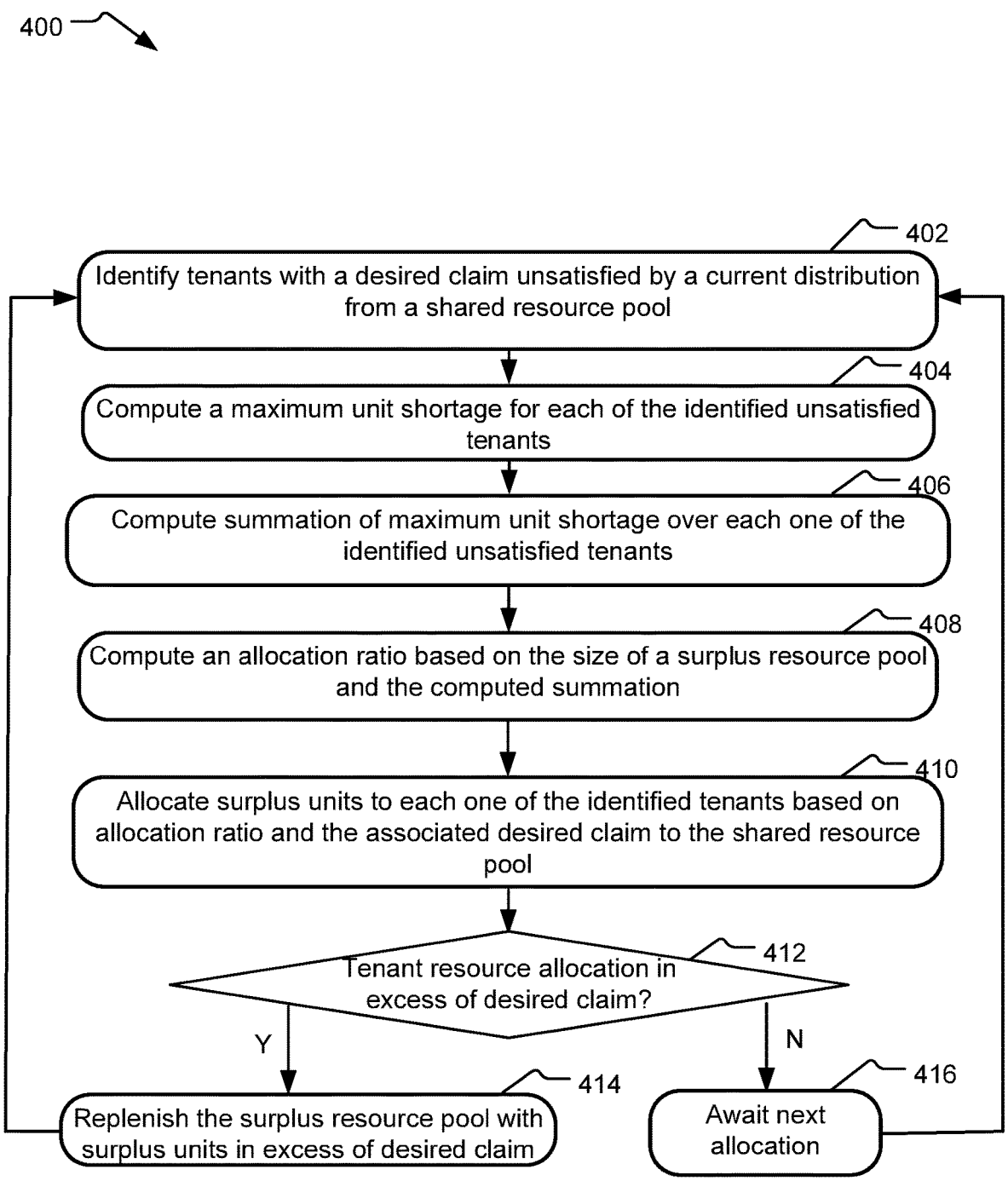
FIG. 4 illustrates example operations for allocating a surplus resource pool among multiple tenants leasing computing resources of a web-based software service.

FIG. 4 illustrates example operations 400 for allocating a surplus resource pool among multiple tenants leasing computing resources of a web-based software service. In one implementation, the operations 400 represent sub-operations of the allocation operation 312 described with respect to FIG. 3. Aspects of the surplus resource pool not described specifically with respect to FIG. 4 below may be the same or similar to the surplus resource pools discussed with respect to FIGS. 1-3, above. In one implementation, the surplus resource pool represents a quantity of elastically-pooled resources that remain available for distribution among active tenants to a shared IoT hub after a guaranteed quantity of the elastically-pooled resources is initially allocated to each one of the active tenants, such as in the manner described above with respect to FIGS. 2 and 3.

A first identifying operation 402 identifies tenants (e.g., IoT hubs) that have a desired claim unsatisfied by a current distribution of the elastically-pooled resources. In the following description, a tenant's desired claim is considered "unsatisfied" when a quantity of resources or computing capacity allocated to a tenant is less than the resource quantity or computing capacity requisite to satisfy the tenant's desired claim. For example, a tenant may be considered 'unsatisfied' when the tenant's initially-allocated guaranteed resources (as described above with respect to FIG. 3) are insufficient to facilitate the processing of incoming IoT hubs requests at a rate that equals or exceeds the request rate.

For example, the tenants identified by the identification operation 402 include tenants having an initial distribution of guaranteed resources from the shared resource pool that is less than its desired claim. Consistent with the descriptions of FIGS. 2 and 3 above, the desired claim may represent a quantity of resource units from the shared resource pool sufficient to satisfy a current computing demand for an individual tenant. For example, the desired claim may quantify a computing capacity sufficient to process incoming messages at a rate that approximately equals a rate at which those same messages are received at an endpoint (e.g., an ingestion endpoint of an IoT hub). In one implementation, the desired claim is determined in a manner consistent with that described with respect to FIGS. 2 and 3 above.

A computing operation 404 computes, for each of the unsatisfied tenants, a "maximum unit shortage," which is a metric that generally quantifies a maximum number of additional resource units that the tenant may be allocated from the surplus resource pool. According to one implementation, the maximum unit shortage for an unsatisfied tenant is defined by the difference between the tenant's maximum potential claim and the guaranteed resources that the tenant was allocated in an initial allocation (e.g., maximum potential claim—current resource allocation).

Another computing operation 406 computes another metric referred to herein as "weighted units" representing a summation of the maximum unit shortage of over each one of the unsatisfied tenants. In one implementation, the weighted units are given by equation (1) below, where 'n' represents an index of one of the identified unsatisfied tenants and 'M' represents the total number of unsatisfied tenants.

$$\text{Weighted Units} = \sum_{n=\text{Tenant A}}^{n=\text{Tenant M}} (\text{max potential claim}(n) - \text{current resource allocation}(n)) \quad (1)$$

Still another computation operation 408 computes an allocation ratio based on the computed summation (the weighted units given by equation 1) and the size of the surplus resource pool. The allocation ratio generally represents a fraction of the desired claim of each tenant that is to be allocated to the tenant from the surplus pool. In one implementation, the allocation ratio is generally represented by equation (2) below, which is a ratio between a total number of surplus resource units remaining in the shared resource pool and the weighted units computed via the computing operation 406.

$$\text{Allocation Ratio} = \frac{\text{Surplus Units}}{\text{Weighted Units}} \quad (2)$$

An allocation operation 410 allocates the surplus units in the surplus resource pool among the unsatisfied tenants based on the computed allocation ratio and the desired claim of each tenant to the shared resource pool. According to one implementation, the surplus allocation for a particular tenant is given by equation (3) below.

$$\text{Allocation Surplus}(\text{Tenant}(n)) = \text{desired claim}(\text{tenant}(n)) \times \text{allocation ratio} \quad (3)$$

A determination operation 412 determines whether the allocation operation 410 leaves any one of the identified tenants with a resource allocation that exceeds the tenant's desired claim. If so, a replenishing operation 414 replenishes the surplus pool with the previously-allocated surplus units in that amount to an excess over the desired claim for one or more of the tenants. If, for example, tenant A has a desired claim of 11 resource units and the allocation surplus (e.g., determined per equation (3)) leaves tenant A with a total allocation of 13 resource units, the replenishing operation 414 returns the excessive two resource units to the surplus pool, leaving tenant A with 11 resource units. In this case, the identification operation 402 is repeated to identify "still unsatisfied tenants," or tenants for which the associated desired claim is not yet satisfied. The computing operations 404, 406, and 408 are repeated to calculate a new allocation ratio (e.g., based on the new size of the surplus pool and adjusted weighted units to account for the fact that one or more of the initially-unsatisfied tenants may have become satisfied by way of the prior surplus distribution).

The operations 402-414 may be repeated a set number of times or until the determination operation 412 determines that there are no tenants with a current resource allocation in excess of the desired claim. According to one example implementation, the operations 402-414 are repeated a maximum number of three times. Other iteration limits may be imposed in other implementations. Once an iteration limit is met and/or there are no tenants with a current resource allocation in excess of the desired claim, a waiting operation 416 is assumed to await a change in the desired claim(s) and subsequent allocation of guaranteed resources (e.g., per the operation 308 in FIG. 3), at which time the operations 400 begin anew.

Figure 5A:
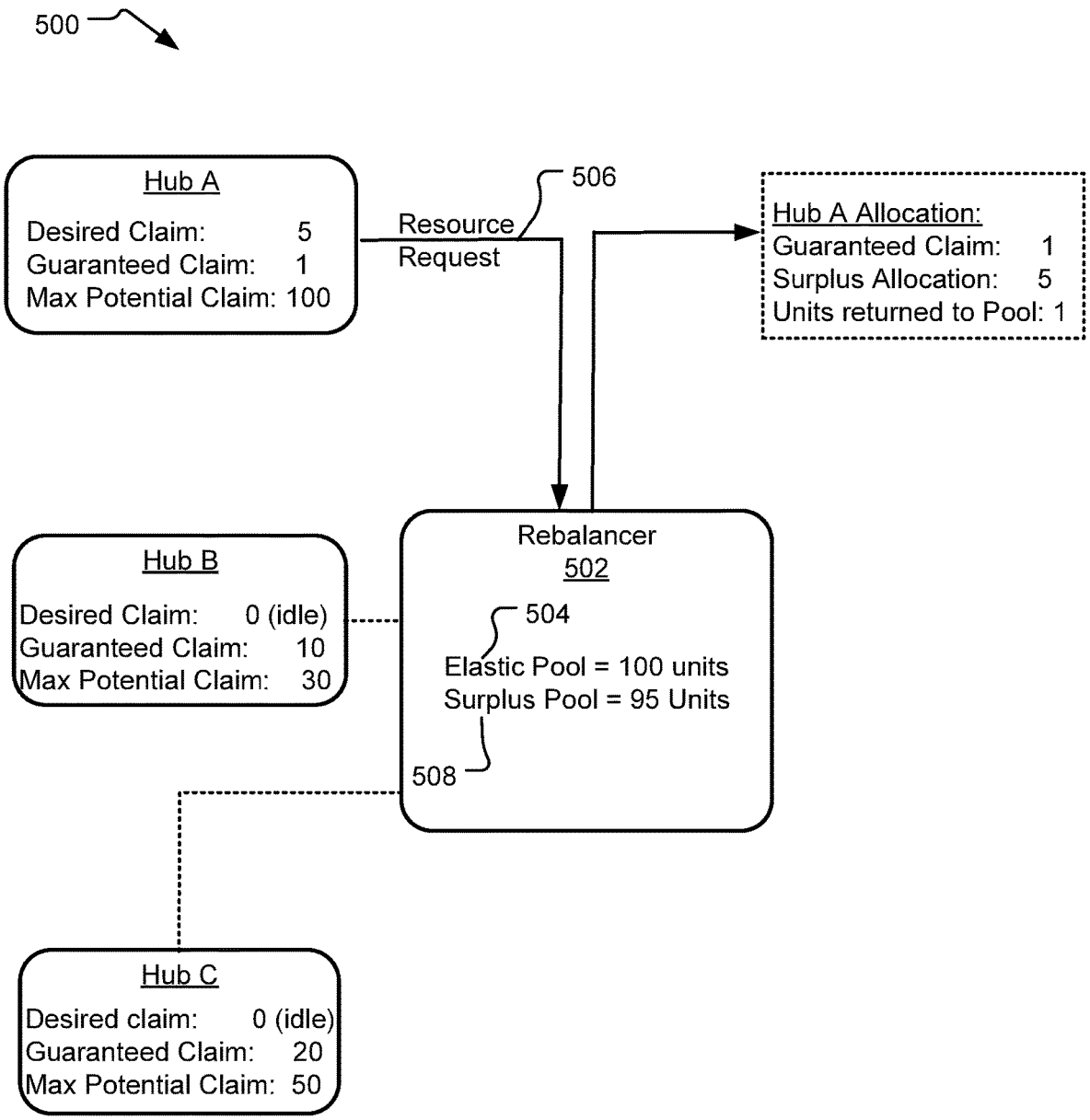
FIG. 5A illustrates a system performing example operations for dynamic throughput rebalancing between multiple IoT hubs sharing an elastic resource pool.

FIG. 5A-5D illustrate example allocation steps generally exemplifying the operations discussed above with respect to FIGS. 3-4. FIG. 5A illustrates a system 500 performing example allocation operations for dynamic throughput rebalancing between multiple IoT hubs sharing an elastic resource pool 504.

The system 500 includes a rebalancer 502 that dynamically re-provisions computing resources of the elastic resource pool 504 among three IoT hubs—Hub A, Hub B, and Hub C. In the illustrated example, the elastic resource pool 504 includes 100 resource units. Initially, all three hubs are idle. When Hub A becomes active (e.g., receives one or more requests at an ingestion endpoint), Hub A communicates a request 506 for resources to the rebalancer 502.

To answer the request, the rebalancer 502 determines a desired claim in association with each active one of the IoT hubs. Since Hub B and Hub C are idle, the rebalancer 502 determines a desired claim (e.g., a desired operating capacity) for Hub A. In one implementation, the rebalancer 502 determines one or more request rates for Hub A and calculates a desired claim based on the request rate(s). For example, the rebalancer 502 may periodically record timestamp information and a number of requests of each of one or more target types made to each hub over a known interval. With this information, the rebalancer 502 can determine a request rate for each target type of request and compute the desired claim on computing capacity of the elastic pool.

In the illustrated example, the rebalancer 502 determines that Hub A has a desired claim of 5 resource units. The rebalancer 502 determines that Hub A has a guaranteed claim of 1 resource unit and a maximum potential claim of 100 resource units. Per the logical steps outlined with respect to FIG. 4, the rebalancer 502 allocates the guaranteed claim (e.g., 1 resource unit) and determines the surplus (e.g., 100−1=99 resource units). The rebalancer 502 then determines an allocation ratio representing a fraction of Hub A's desired claim that is to be allocated to Hub A from a surplus pool 508. This allocation ratio is based on the guaranteed claim and the maximum potential claim of each active tenant.

To determine the allocation ratio, the rebalancer 502 first computes a maximum unit shortage for each of the active tenants. Here, Hub A has a maximum unit shortage defined by the difference between its maximum potential claim (100 resource units) and its guaranteed claim 1 resource units). The rebalancer computes weighted units (a sum of the maximum unit shortages for each of the active tenants). Since Hub A is the only active tenant at this point in time, the weighted units for the surplus distribution are given by 100−1, or 99. The rebalancer 502 computes an allocation ratio, or the ratio between the surplus (99) and the weighted units (99), which is 99/99 or 1 in the present example. To determine how many surplus units to allocate to Hub A, the rebalancer 502 multiples the desired claim of Hub A by the allocation ratio (e.g., 5×1), and allocates Hub A 5 of the surplus units. After this allocation, Hub A has the 6 resource units (1 guaranteed+5 surplus). This exceeds the desired claim of 5, so one resource unit is returned to the surplus pool 508 leaving Hub A with 5 total units and 95 resource units in the surplus pool 508.

Figure 5B:
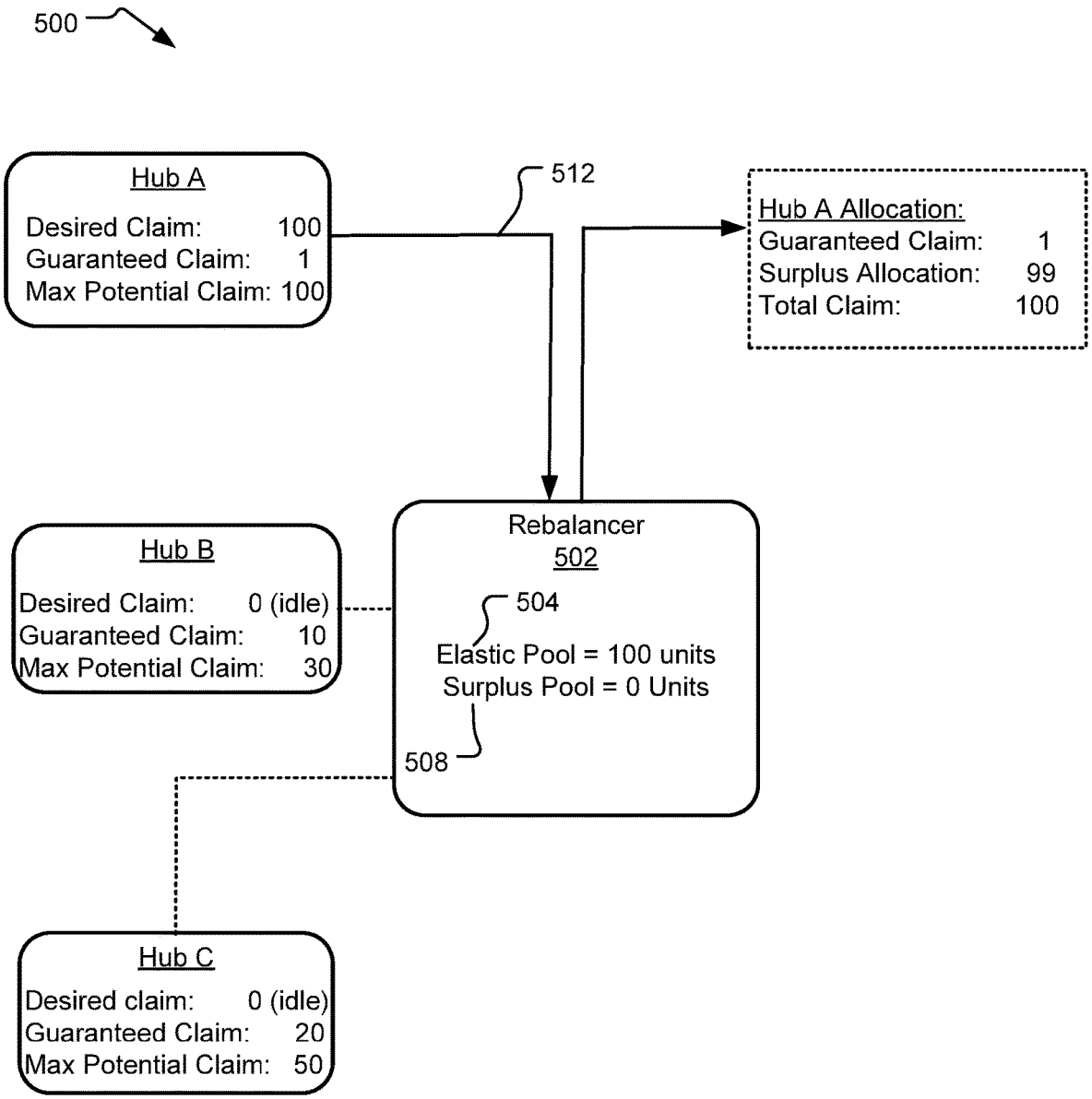
FIG. 5B illustrates the system of FIG. 5A performing further example operations for dynamic throughput rebalancing.

FIG. 5B illustrates the system 500 performing further allocation operations for dynamic throughput rebalancing following the example operations discussed with respect to FIG. 5A. At a point in time following the above-described allocation of 5 resource units to Hub A, a request rate for Hub A increases. Hub A determines that the currently-allocated 5 resource units are insufficient to satisfy the increased request rate and, consequently, transmits another resource request 512. Hub B and Hub C remain idle.

To answer the request 512, the rebalancer 502 determines the desired claim sufficient to satisfy the request rate for Hub A. This time, the rebalancer 502 determines that Hub A has a desired claim of 100 total resource units. The rebalancer 502 allocates the guaranteed claim (e.g., 1 resource unit) and determines the surplus (e.g., 100−1=99 resource units). The rebalancer 502 computes a maximum unit shortage for each of the active tenants (e.g., Hub A with a maximum unit shortage of 100−1=99 resource units). The rebalancer 502 computes weighted units (a sum of the maximum unit shortages for each of the active tenants). Since Hub A is still the only active tenant at this point in time, the weighted units for the surplus distribution are given by 100−1, or 99. The rebalancer 502 computes an allocation ratio between the surplus and the weighted units (99/99), and multiplies this ratio (1) by the desired claim of Hub A, awarding Hub A all of the remaining 99 units in the surplus pool.

Figure 5C:
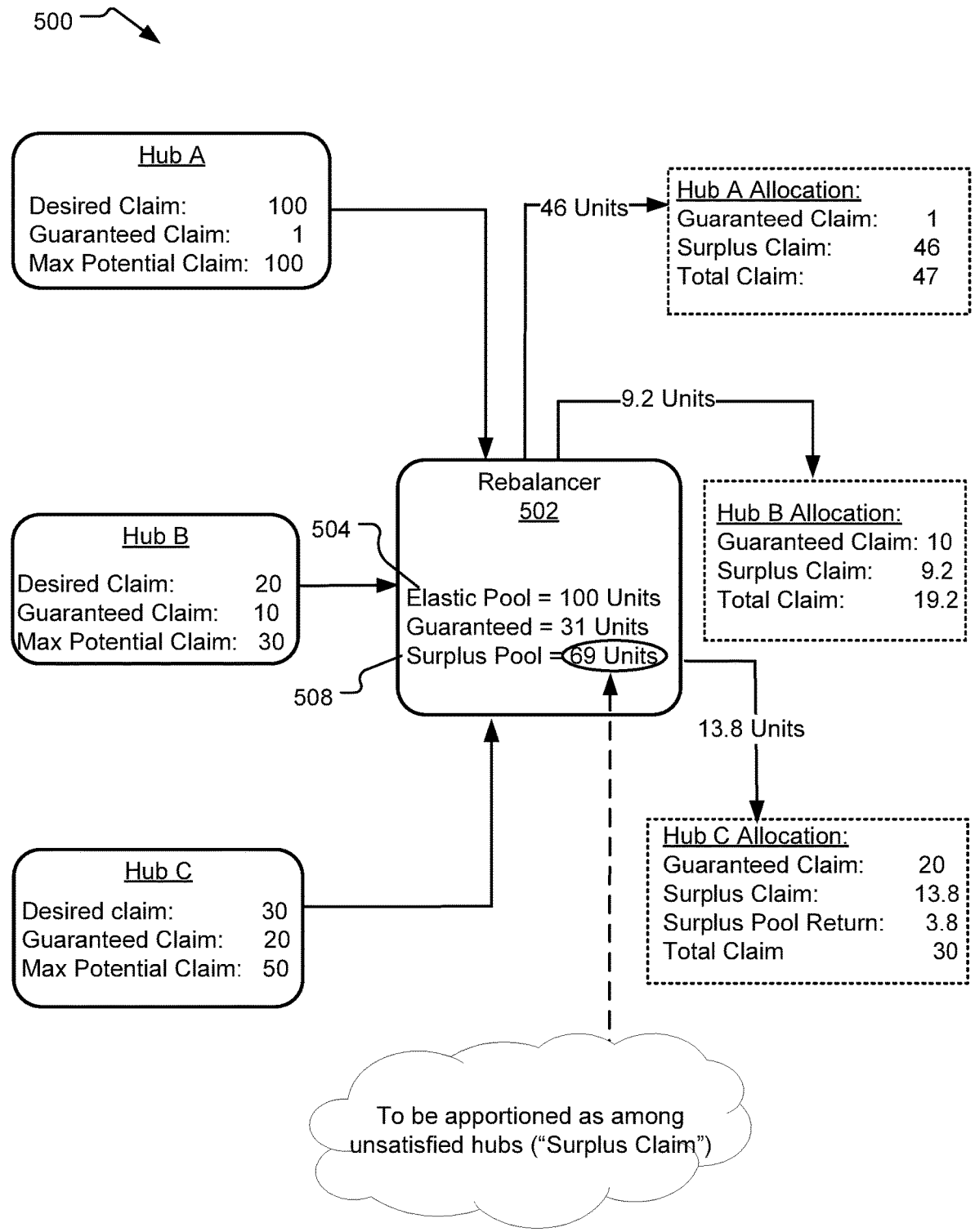
FIG. 5C illustrates the system of FIGS. 5A and 5B performing further example operations for dynamic throughput rebalancing.

FIG. 5C illustrates the system 500 performing further allocation operations for dynamic throughput rebalancing following the example operations discussed with respect to FIGS. 5A-5B. In FIG. 5C, the rebalancer 502 receives resource requests from Hub B and C. Since Hub A was previously allocated 100% of the units in the elastic pool 504, the rebalancer 502 responds to the requests by performing actions to reallocate the resources of the elastic pool 504 among the hubs. The rebalancer 502 identifies a desired claim in association with each active one of the IoT hubs—Hub A, Hub B, and Hub C. Here, the rebalancer 502 identifies that Hub A has a desired claim of 100 resource units; Hub B has a desired claim of 20 resource units; and Hub C has a desired claim of 30 resource units.

The rebalancer 502 begins the rebalancing by re-allocating the guaranteed resources to each of the active hubs. Since each of the hubs has a desired claim greater than its guaranteed claim, the rebalancer 502 allocates the guaranteed claim. In alternate throughput rebalancing scenarios where one of the hubs has a desired claim less than its guaranteed claim, the rebalancer 502 may adjust the guaranteed claim to equal the desired claim and allocate that amount. In FIG. 5C, Hub A is guaranteed 1 resource unit; Hub B is guaranteed 10 resource units; and Hub C is guaranteed 20 resource units. The rebalancer 502 determines the size of the surplus pool by subtracting the allocated guaranteed units from the total elastic pool (e.g., 100−(1+10+20)=69 resource units).

Following the allocation of the guaranteed resource units, the rebalancer 502 identifies "unsatisfied tenants," or tenants for which the desired claim is not satisfied by the current resource allocation. Here, each of Hubs A, B, and C are unsatisfied, so the rebalancer 502 determines that the surplus pool (69 resource units) is to be apportioned between all three hubs (e.g., portions x, y, and z) according to an allocation ratio determined based on fairness considerations (e.g., the guaranteed claim and max potential claim for each tenant) and the desired claim of each of the hubs.

The rebalancer 502 then determines the allocation ratio to determine the fractional quantity that each tenant may be allocated of its associated desired claim. As in the above examples, the rebalancer 502 determines weighted units, or the summation of the (potential maximum claim—guaranteed claim) for each active tenant, which is in this case 149 (e.g., (100−1)+(30−10)+(50−20)). The allocation ratio is given by the surplus pool (69) divided by the weighted units, or 69/149=0.46.

To determine the surplus claim (e.g., the number of resource units from the surplus pool 508 to allocate to each hub) the rebalancer 502 multiples the allocation ratio by the desired claim for each hub. Here, Hub A receives a surplus of 46 resource units (e.g., 0.46×100); Hub B receives a surplus of 19.2 resource units (e.g., 0.46×20); and hub C receives a surplus of 13.8 resource units (e.g., 0.46×30). After this allocation, Hub C has a total claim of 33.8 resource units, which is 3.8 resource units. This exceeds the desired claim of 30 resource units, so 3.8 resource units are returned to the surplus pool 508.

Figure 5D:
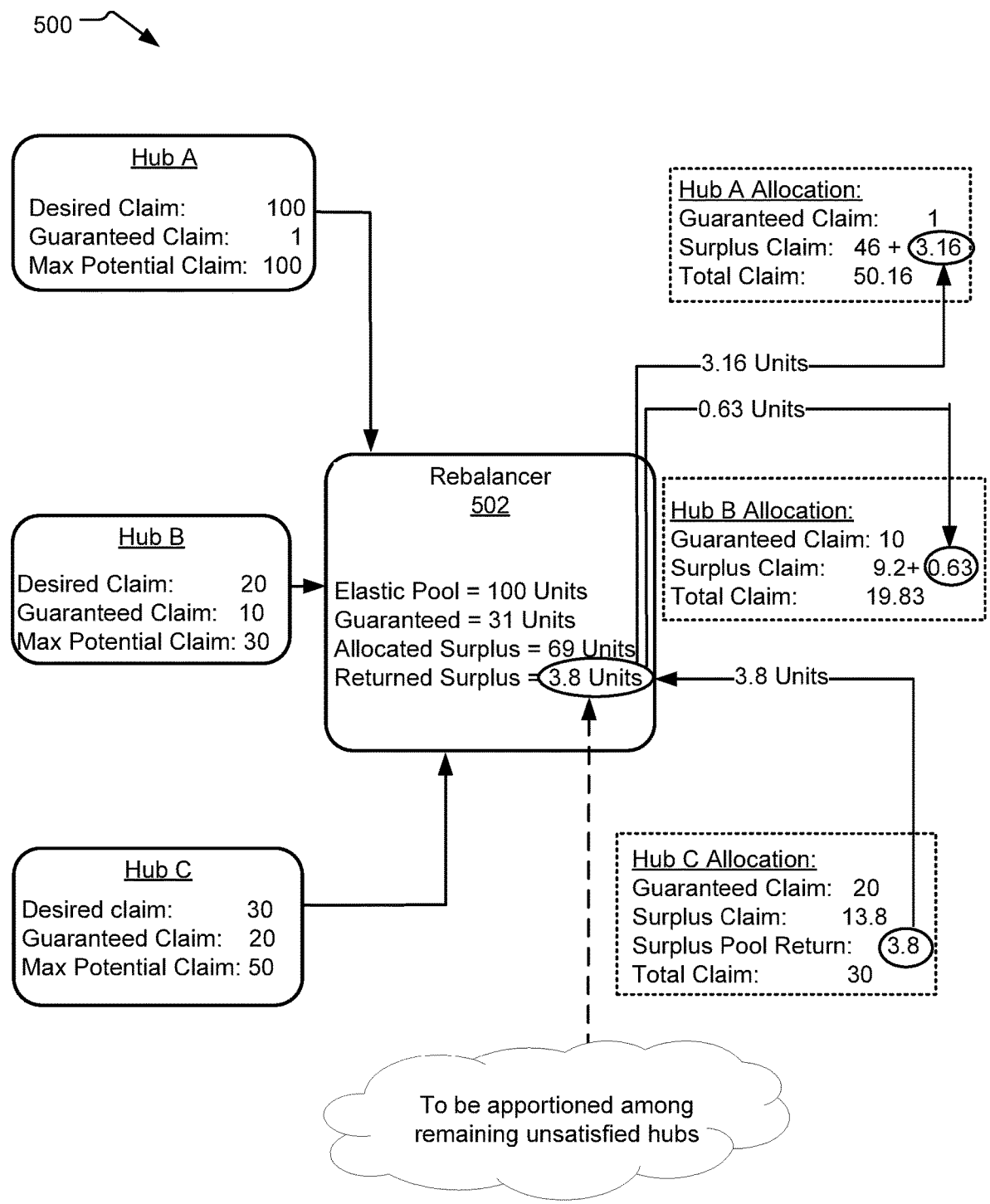
FIG. 5D illustrates the system of FIG. 5A-5C performing still further example operations for dynamic throughput rebalancing.

FIG. 5D illustrates the system 500 performing further allocation operations for dynamic throughput rebalancing following the example operations discussed with respect to FIG. 5C. After an allocation of guaranteed resources and an allocation of a surplus claim to each of Hub A, Hub B, and Hub C, Hub C is left with a total claim (33.8 resource units) that exceeds its desired claim (30 resource units). The overage (3.8 resource units) is returned to the surplus pool and hub C is left with a total claim of 30 resource units.

Following the return of the surplus units to the surplus pool from all hubs with an allocation exceeding the associated desired claim, the rebalancer 502 again identifies unsatisfied tenants, or tenants for which the desired claim is not satisfied by the current resource allocation. Here, the rebalancer determines that Hub C is satisfied, so the remaining surplus pool (3.8 units) is to be apportioned between Hubs A and B.

Since the number of satisfied hubs has changed, the rebalancer 502 computes a new allocation ratio representing a fractional quantity of the associated desired claim that each of the unsatisfied hubs may be allocated from the returned surplus (3.8 units). Per the same logic detailed above, rebalancer 502 determines weighted units, or the summation of the (potential maximum claim—guaranteed claim) for each active tenant and arrives at 119 (e.g., (100−1)+(30−10)). The allocation ratio is given by the surplus pool divided by the weighted units, or 3.8/119=0.0319.

To determine a secondary surplus claim to allocate to each of Hubs A and B, the rebalancer 502 multiples the new allocation ratio by the desired claim for each hub. Here, Hub A receives an additional surplus of 3.16 resource units and Hub B receives an additional surplus of 0.63 resource units. After this allocation, Hub A has a total claim of 50.16 resource units; Hub B has a total claim of 19.83 resource units; and Hub C has a total claim of 30 resource units. All units in the elastic pool have been allocated.

Figure 6:
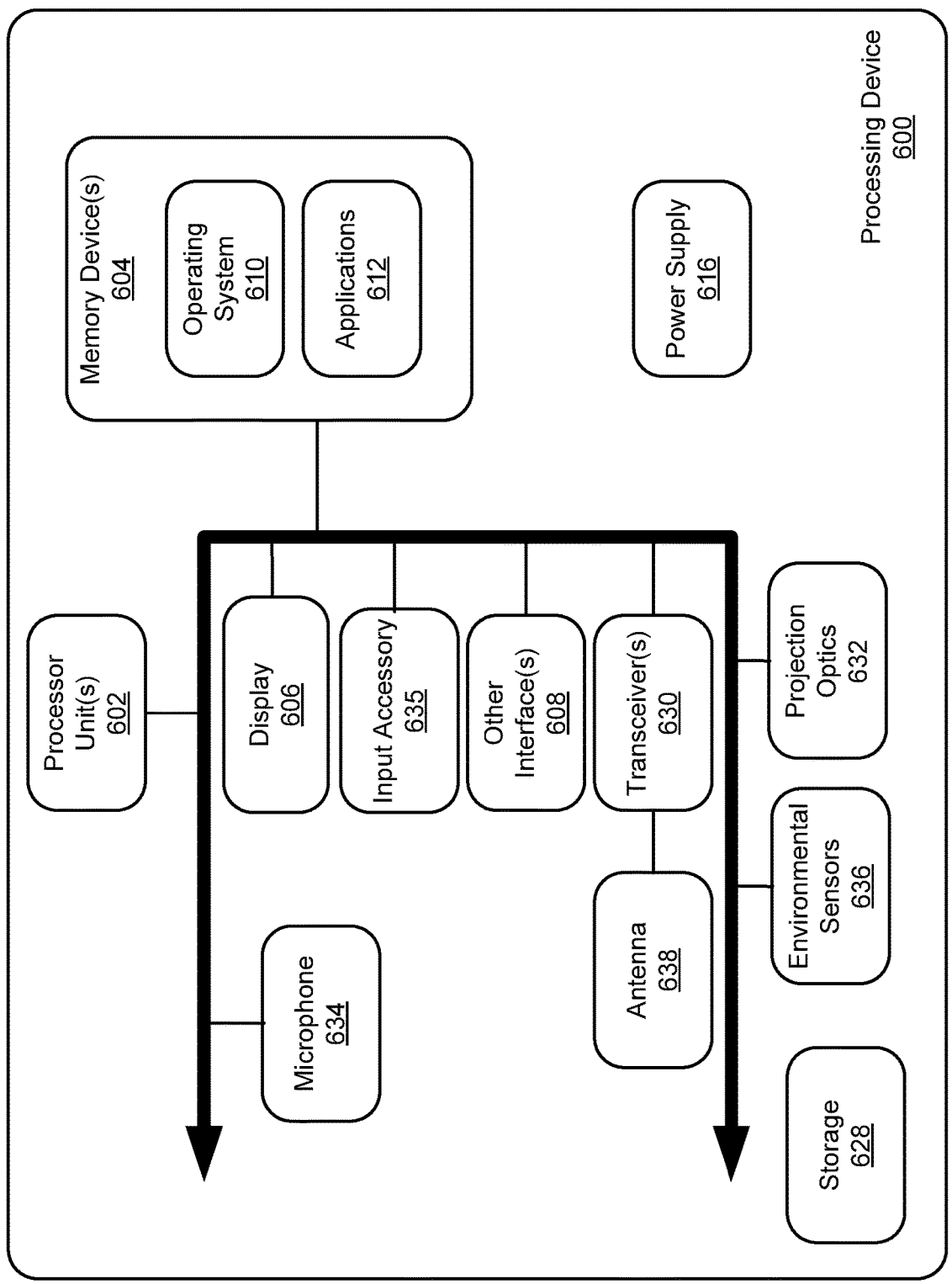
FIG. 6 illustrates an example schematic of a processing device suitable for implementing aspects of the disclosed technology.

FIG. 6 illustrates an example schematic of a processing device 600 suitable for implementing aspects of the disclosed technology. The processing device 600 includes one or more processor unit(s) 602, memory 604, a display 606, and other interfaces 608 (e.g., buttons). The memory 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory 604 and is executed by the processor unit(s) 602, although it should be understood that other operating systems may be employed.

One or more applications 612 are loaded in the memory 604 and executed on the operating system 610 by the processor unit(s) 602. Applications 612 may receive input from various input local devices such as a microphone 634, input accessory 635 (e.g., keypad, mouse, stylus, touchpad, gamepad, racing wheel, joystick). Additionally, the applications 612 may receive input from one or more remote devices such as remotely-located smart devices (e.g., smart devices 108 of FIG. 1) by communicating with such devices over a wired or wireless network using more communication transceivers 630 and an antenna 638 to provide network connectivity (e.g., a mobile phone network, Wi-Fi®, Bluetooth®). The processing device 600 may also include various other components, such as a positioning system (e.g., a global positioning satellite transceiver), one or more accelerometers, one or more cameras, an audio interface (e.g., the microphone 634, an audio amplifier and speaker and/or audio jack), and storage devices 628. Other configurations may also be employed.

The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources.

In an example implementation, computing resource of a shared resource pool (e.g., elastic IoT hub resources) may include hardware and/or software embodied by instructions stored in the memory 604 and/or the storage devices 628 and processed by the processor unit(s) 602. The memory 604 may be the memory of a host device or of an accessory that couples to the host.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method disclosed herein includes determining, for each of multiple tenants leasing computing resources of a shared resource pool, a desired claim to resources in the shared resource pool. The desired claim is based on a number of resource access requests received in association with each of the multiple tenants. The method further includes determining, for each of the multiple tenants, a guaranteed claim and a maximum potential claim on the shared resource pool, and allocating a surplus resource pool among the multiple tenants based on the determined maximum potential claim and the desired claim for each one of the multiple tenants. The surplus resource pool represents a remainder of the shared resource pool after the guaranteed claim for each of the tenants is satisfied via an initial resource allocation from the shared resource pool.

Another example method of any preceding method further includes adjusting the guaranteed claim to equal the desired claim responsive to a determination that the desired claim is less than or equal to the guaranteed claim.

In still another example method of any preceding method, the method further includes identifying unsatisfied tenants, computing an allocation ratio, and allocating a surplus resource pool among the identified unsatisfied tenants based on the allocation ratio. Each of the identified unsatisfied tenants is a tenant having a desired claim unsatisfied by a current distribution of resources from the shared resource pool prior to the allocation of the surplus resource pool. The allocation ratio is based on a size of the surplus resource pool and a difference between the maximum potential claim and the guaranteed claim for each of the identified unsatisfied tenants.

In still another example method of any preceding method, computing the allocation ratio further comprises calculating a maximum unit shortage for each of the unsatisfied tenants and determining weighted units by summing together the maximum unit shortage for each of the unsatisfied tenants. For example, the maximum unit shortage represents the difference between the maximum potential claim and the guaranteed claim and the allocation ratio is based on the weighted units.

In yet still another example method of any preceding method, the allocation ratio represents a ratio between a size of the surplus resource pool and the weighted units.

In yet still another example method of any preceding method, the maximum potential claim is dynamically alterable by each of the multiple tenants.

In still another example method of any preceding method, the method further comprises identifying unsatisfied tenants having a resource allocation insufficient to satisfy the associated desired claim at a time subsequent to allocation of the surplus resource pool. The surplus resource pool is replenished with a quantity of previously-allocated resource units determined to exceed the associated desired claim for a tenant previously-allocated the quantity of resource units, and the surplus resource pool is reallocated among the identified unsatisfied tenants based on the maximum potential claim associated with each tenant.

An example system disclosed herein includes a rebalancer stored in memory and executable to determine, for multiple tenants leasing computing resources of a shared resource pool, a desired claim to resources in the shared resource pool. The desired claim is based on a number of resource access requests received at an endpoint associated with each one of the multiple tenants. A guaranteed claim and a maximum potential claim to the resources of the shared resource pool is determined for each of the multiple tenants and a surplus resource pool is allocated among the multiple tenants based on the determined maximum potential claim and the desired claim for each one of the multiple tenants. The surplus resource pool represents a remainder of the of the shared resource pool after the guaranteed claim for each of the tenants is satisfied via an initial resource allocation from the shared resource pool.

In another example system of any preceding system, the rebalancer is further executable to adjust the guaranteed claim to equal the desired claim responsive to a determination that the desired claim is less than or equal to the guaranteed claim.

In yet still another example system of any preceding system, the rebalancer is executable to allocate the surplus resource pool by identifying one or more unsatisfied tenants, computing an allocation ratio, and allocating the surplus resource pool based among the identified unsatisfied tenants based on the allocation ratio. Each of the unsatisfied tenants is a tenant having a desired claim that is unsatisfied by a current distribution of resources from the shared resource pool prior to the surplus pool allocation. The allocation ratio is computed based on a size of the shared resource pool and a difference between the maximum potential claim and the guaranteed claim for each of the identified unsatisfied tenants.

In yet another example system of any preceding system, the rebalancer is executable to compute the allocation ratio by calculating a maximum unit shortage for each of the unsatisfied tenant, determining weighted units, and calculating the allocation ratio based on the weighted units. For example, the maximum unit shortage represents the difference between the maximum potential claim and the guaranteed claim, and the weighed units are determined by summing together the maximum unit shortage for each of the unsatisfied tenants.

In yet another example system of any preceding system, the allocation ratio represents a ratio between a size of the surplus resource pool and the weighted units.

In yet still another example system of any preceding system, the maximum potential claim is dynamically alterable by each of the multiple tenants.

In yet still another example system of any preceding system, the rebalancer is further executable to identify unsatisfied tenants having a resource allocation insufficient to satisfy the associated desired claim; replenish the surplus resource pool with a quantity of previously-allocated resource units determined to exceed the associated desired claim for a tenant previously-allocated the quantity of resource units; and reallocate the surplus resource pool among the identified unsatisfied tenants based on the maximum potential claim associated with each tenant.

In an example memory device encoding computer-executable instructions for executing a computer process, the computer process includes determining, for each of multiple tenants leasing computing resources of a shared resource pool, a desired claim to resources in the shared resource pool. The desired claim is based on a number of resource access requests received in association with each of the multiple tenants. The computer process further comprises determining, for each of the multiple tenants, a guaranteed claim and a maximum potential claim on the shared resource pool and allocating a surplus resource pool among the multiple tenants based on the determined maximum potential claim and the desired claim for each one of the multiple tenants. For example, the surplus resource pool represents a remainder of the shared resource pool after the guaranteed claim for each of the tenants is satisfied via an initial resource allocation from the shared resource pool.

In an example computer process of any preceding computer process, the computer process further comprises adjusting the guaranteed claim to equal the desired claim responsive to a determination that the desired claim is less than or equal to the guaranteed claim.

In still another example computer process of any preceding computer process, the computer process further comprises identifying unsatisfied tenants, computing an allocation ratio, and allocating the surplus resource pool among the identified unsatisfied tenants based on the allocation ratio. Each unsatisfied tenant has desired claim that is unsatisfied by a current distribution of resources from the shared resource pool and the allocation ratio is based on a size of the surplus resource pool and a difference between the maximum potential claim and the guaranteed claim for each of the identified unsatisfied tenants.

In yet still another example computer process of any preceding computer process, the computer process further comprises calculating a maximum unit shortage for each of the unsatisfied tenants, determining weighted units, and calculating the allocation ratio based on the weighted units. For example, the maximum unit shortage represents the difference between the maximum potential claim and the guaranteed claim and the weighted units are determined by summing together the maximum unit shortage for each of the unsatisfied tenants.

In yet still another example computer process of any preceding computer process, the allocation ratio represents a ratio between a size of the surplus resource pool and the weighted units.

In still another example computer process of any preceding computer process, the maximum potential claim is dynamically alterable by each of the multiple tenants.

An example system disclosed herein includes a means for determining, for each of multiple tenants leasing computing resources of a shared resource pool, a desired claim to resources in the shared resource pool. The desired claim is based on a number of resource access requests received in association with each of the multiple tenants. The method further includes a means for determining, for each of the multiple tenants, a guaranteed claim and a maximum potential claim on the shared resource pool. The method further comprises a means for allocating a surplus resource pool among the multiple tenants based on the determined maximum potential claim and the desired claim for each one of the multiple tenants. For example, the surplus resource pool represents a remainder of the shared resource pool after the guaranteed claim for each of the tenants is satisfied via an initial resource allocation from the shared resource pool.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
   determining, for each of multiple tenants leasing computing resources of a shared resource pool, a desired claim to resources in the shared resource pool, the desired claim being based on a number of resource access requests received n association with each of the multiple tenants;
   determining, for each of the multiple tenants, a guaranteed claim and a maximum potential claim on the shared resource pool, the guaranteed claim being a resource quantity that is guaranteed to be allocated to one or more of the multiple tenants when a hub of the one or more multiple tenants is active;
   for each of the one or more of the multiple tenants, reducing the guaranteed claim when the hub of the one or more of the multiple tenants is inactive, the reduction being performed while also providing for an automatic future increase in the guaranteed claim when the huh becomes active, the automatic future increase adjusting the guaranteed claim to equal a lesser of the desired claim and an initial value of the guaranteed claim; and
   allocating a surplus resource pool among the multiple tenants based on the determined maximum potential claim and the desired claim for each one of the multiple tenants, the surplus resource pool representing a remainder of the shared resource pool after the guaranteed claim for each of the multiple tenants is satisfied via an initial resource allocation from the shared resource pool.

2. The method of claim 1, wherein allocating the surplus resource pool further comprises:
   identifying unsatisfied tenants, the desired claim for each unsatisfied tenant unsatisfied by a current distribution of resources from the shared resource pool; and
   computing an allocation ratio based on a size of the surplus resource pool and a difference between the maximum potential claim and the guaranteed claim for each of the identified unsatisfied tenants; and
   allocating the surplus resource pool among the identified unsatisfied tenants based on the allocation ratio.

3. The method of claim 2, wherein computing the allocation ratio further comprises:
   calculating a maximum unit shortage for each of the unsatisfied tenants, the maximum unit shortage representing the difference between the maximum potential claim and the guaranteed claim; and
   determining weighted units by summing together the maximum unit shortage for each of the unsatisfied tenants, the allocation ratio being based on the weighted units.

4. The method of claim 3, wherein the allocation ratio represents a ratio between a size of the surplus resource pool and the weighted units.

5. The method of claim 1, wherein the maximum potential claim is dynamically alterable by each of the multiple tenants.

6. The method of claim 1, further comprising:
   subsequent to the allocation of the surplus resource pool, identifying unsatisfied tenants having a resource allocation insufficient to satisfy the associated desired claim;
   replenishing the surplus resource pool with a quantity of previously-allocated resource units determined to exceed the associated desired claim for a tenant previously-allocated the quantity of resource units; and
   re-allocating the surplus resource pool among the identified unsatisfied tenants based on the maximum potential claim associated with each tenant.

7. A system comprising:
   tangible memory;
   a rebalancer stored in the tangible memory and executable to:
   determine, for multiple tenants leasing computing resources of a shared resource pool, a desired claim to resources in the shared resource pool, the desired claim being based on a number of resource access requests received at an endpoint associated with each one of the multiple tenants;
   for each of the multiple tenants, determine a guaranteed claim and a maximum potential claim to the resources of the shared resource pool, the guaranteed claim being a resource quantity that is guaranteed to be allocated to one or more of the multiple tenants when a hub of the one or more of the multiple tenants is active;

for each of the one or more of the multiple tenants, reduce the guaranteed claim when the hub of the one or more of the multiple tenants is inactive while also providing for an automatic future increase in the guaranteed claim when the hub becomes active, the automatic future increase adjusting the guaranteed claim to equal a lesser of the desired claim and an initial value of the guaranteed claim; and allocate a surplus resource pool among the multiple tenants based on the determined maximum potential claim and the desired claim for each one of the multiple tenants, the surplus resource pool representing a remainder of the of the shared resource pool after the guaranteed claim for each of the multiple tenants is satisfied via an initial resource allocation from the shared resource pool.

8. The system of claim 7, wherein the rebalancer is executable to allocate the surplus resource pool by:

identifying one or more unsatisfied tenants, the desired claim for each unsatisfied tenant unsatisfied by a current distribution of resources from the shared resource pool; and computing an allocation ratio based on a size of the shared resource pool and a difference between the maximum potential claim and the guaranteed claim for each of the identified unsatisfied tenants; and allocating the surplus resource pool based among the identified unsatisfied tenants based on the allocation ratio.

9. The system of claim 8, wherein the rebalancer is executable to compute the allocation ratio by:

calculating a maximum unit shortage for each of the unsatisfied tenants, the maximum unit shortage representing the difference between the maximum potential claim and the guaranteed claim; and determine weighted units by summing together the maximum unit shortage for each of the unsatisfied tenants, the allocation ratio being based on the weighted units.

10. The system of claim 9, wherein the allocation ratio represents a ratio between a size of the surplus resource pool and the weighted units.

11. The system of claim 8, wherein the maximum potential claim is dynamically alterable by each of the multiple tenants.

12. The system of claim 8, wherein the rebalancer is further executable to:

subsequent to the allocation of the surplus resource pool, identify unsatisfied tenants having a resource allocation insufficient to satisfy the associated desired claim;

replenish the surplus resource pool with a quantity of previously-allocated resource units determined to exceed the associated desired claim for a tenant previously-allocated the quantity of resource units; and reallocate the surplus resource pool among the identified unsatisfied tenants based on the maximum potential claim associated with each tenant.

13. One or more memory devices including a tangible computer-readable storage media encoding computer-executable instructions for executing a computer process, the computer process comprising:

determining, for each of multiple tenants leasing computing resources of a shared resource pool, a desired claim to resources in the shared resource pool, the desired claim being based on a number of resource access requests received in association with each of the multiple tenants;

determining, for each of the multiple tenants, a guaranteed claim and a maximum potential claim on the shared resource pool, the guaranteed claim being a resource quantity that is guaranteed to be allocated to one or more of the multiple tenants when a hub of the one or more of the multiple tenants is active;

for each of the one or more of the multiple tenants, reducing the guaranteed claim when the hub of the one or more of the multiple tenants is inactive, the reduction being performed while also providing for an automatic future increase in the guaranteed claim when the hub becomes active, the automatic future increase adjusting the guaranteed claim to equal to a lesser of the desired claim and an initial value of the guaranteed claim; and allocating a surplus resource pool among the multiple tenants based on the determined maximum potential claim and the desired claim for each one of the multiple tenants, the surplus resource pool representing a remainder of the shared resource pool after the guaranteed claim for each of the multiple tenants is satisfied via an initial resource allocation from the shared resource pool.

14. The one or more memory devices of claim 13, wherein the computer process further comprises:

identifying unsatisfied tenants, the desired claim for each unsatisfied tenant unsatisfied by a current distribution of resources from the shared resource pool; and computing an allocation ratio based on a size of the surplus resource pool and a difference between the maximum potential claim and the guaranteed claim for each of the identified unsatisfied tenants; and allocating the surplus resource pool among the identified unsatisfied tenants based on the allocation ratio.

15. The one or more memory devices of claim 14, wherein the computer process further comprises:

calculating a maximum unit shortage for each of the unsatisfied tenants, the maximum unit shortage representing the difference between the maximum potential claim and the guaranteed claim; and determining weighted units by summing together the maximum unit shortage for each of the unsatisfied tenants, the allocation ratio being based on the weighted units.

16. The one or more memory devices of claim 15, wherein the allocation ratio represents a ratio between a size of the surplus resource pool and the weighted units.

17. The one or more memory devices of claim 13, wherein the maximum potential claim is dynamically alterable by each of the multiple tenants.

* * * * *